United States Patent [19]
Duddek et al.

[11] Patent Number: 5,144,317
[45] Date of Patent: Sep. 1, 1992

[54] METHOD OF DETERMINING MINING PROGRESS IN OPEN CAST MINING BY MEANS OF SATELLITE GEODESY

[75] Inventors: Herbert Duddek, Bergheim; Wilfried Klemmer, Dahlem; Herbert Koeppen, Berqheim, all of Fed. Rep. of Germany

[73] Assignee: Rheinbraun Aktiengesellschaft, Köln, Fed. Rep. of Germany

[21] Appl. No.: 675,691

[22] Filed: Mar. 27, 1991

[30] Foreign Application Priority Data

Apr. 7, 1990 [DE] Fed. Rep. of Germany ....... 4011316

[51] Int. Cl.⁵ .......................... H04B 7/185; G01S 5/02
[52] U.S. Cl. .................................................. 342/357
[58] Field of Search .................. 342/357, 356, 463; 37/DIG. 1, DIG. 14, DIG. 20; 299/1; 364/424.01

[56] References Cited

U.S. PATENT DOCUMENTS

4,675,684  6/1987  Spence ............................. 342/394
5,020,860  6/1991  Bessinger et al. ..................... 299/1

*Primary Examiner*—Theodore M. Blum
*Attorney, Agent, or Firm*—Howson & Howson

[57] ABSTRACT

In a method of determining mining progress and the mined masses in open cast mining the position and orientation of the extraction device such as a bucket wheel of a travelling excavator are ascertained by means of satellite geodesy using a receiver in the vicinity of the bucket wheel and a further receiver at another location on the excavator.

9 Claims, 4 Drawing Sheets

METHOD OF DETERMINING MINING PROGRESS IN OPEN CAST MINING BY MEANS OF SATELLITE GEODESY

BACKGROUND OF THE INVENTION

The invention generally concerns a method of determining mining progress in open cast mining using satellite geodesy.

For the purposes of ascertaining the geodetic position of a point, that is to say the co-ordinates in respect of length, width and height of that point, by means of satellite geodesy, in principle at least four satellites are required. The signals emitted from the satellites can then be simultaneously received by a receiver which corresponds to the point whose geodetic position is to be ascertained. The co-ordinates of that point are ascertained by a procedure in which the distance from that point to three of the satellites is detected, with the transit time, that is to say the difference in terms of time between the time at which the transmitted signals are emitted and the time at which the transmitted signals are received being used in order to ascertain the distance between the above-mentioned point and the respective three satellites. As however the satellites on the one hand and the receiver on the other hand have different time measurement systems, the fourth satellite referred to above is necessary to adapt and correct the time measuring systems and thus determine a reference time. That ensures that the actual signal transit times can be properly ascertained. As the respective co-ordinates of the satellites are known, the co-ordinates of the receiver at the point whose position is to be determined can be clearly ascertained from the respective distances and the time correction effect referred to above.

The Global Positioning System (GPS) which is being built at the present time, in the United States of America, is for example suitable for satellite geodesy purposes. That system is planned to have at least 21 navigational satellites disposed around the earth in such a way that it is possible to take a bearing on and communicate with at least four satellites simultaneously from any position on the earth at any time.

At the present time, when ascertaining co-ordinates of a point by means of satellite geodesy, a level of accuracy of ±10 meters can be achieved in terms of absolute positional measurement, that is to say if the co-ordinates of a point are ascertained directly from the measured distances. That deviation is due in particular to the fact that the transmission signals from the satellites, in the from of electromagnetic waves, in travelling towards the earth, must pass through different media which cause the ways to suffer deviation in different ways due to refraction, while having different influences on the transit time thereof. It is therefore desirable to provide a further receiver which is disposed in the vicinity of the point whose co-ordinates are to be ascertained, with the co-ordinates of the further receiver being known. By means of what is known as the differential measurement process, it is then possible for the influences, which cannot be foreseen and which cannot be calculated, of the different media on the nature of wave propagation, to be eliminated as it is to be assumed that the signals travel along approximately the same paths to the respective receivers. When using that measurement procedure, it is possible at the present time to achieve a degree of accuracy of about ±0.01 meter. In that connection reference is made to WO 87/06713, to the disclosure and content of which attention is expressly directed for the incorporation thereof into this specification.

The intervals between two co-ordinate determining operations, using satellite geodesy, depend inter alia on the speed of operation of the computer system which evaluates and assesses the signals received. Depending on the computing output, the measurement intervals involved may be for example only one second. Short co-ordinate ascertainment times of that nature permit the positions of moving items of equipment to be almost continuously ascertained.

The invention seeks to make it possible to use the procedure for ascertaining co-ordinates of a point with a relatively high degree of accuracy and with short measurement intervals by means of satellite geodesy, for the purposes of determining the co-ordinates of the extraction device of a travelling large-scale extraction apparatus, for example the position of the bucket wheel of a bucket wheel digger or excavator which is used in open cast mining. In such equipment, the bucket wheel which represents the extraction device for mining purposes is carried by a jib which is generally mounted to a travelling support structure of the digger or excavator, in such a way that the jib is pivotable in an at least substantially vertical plane. For the sake of simplicity, reference will generally be made hereinafter to a bucket wheel excavator, without however the principles of the present invention being restricted thereto.

In regard to operating open cast mining, the results of the operation in regard to the materials produced as well as the current topography of the open-cast mining are factors of especial significance. To carry out an open cast mining procedure, that generally involves producing a model of the deposit to be mined, indicating the arrangement of the individual layers in the deposit, the thicknesses thereof and so forth. On the one hand, the layers in the deposit are those which contain the usable material, for example coal, brown coal or lignite or the like, and on the other hand layers which cover over or are interposed between the layers of the usable material and which must be removed in order to be able to mine the layers of usable material. By reference to that model of the mining terrain, and by virtue of a comparison between the initial situation thereof and the current topography of the deposit, it is possible to find out what amounts of which materials have already been removed and where. In other words, the current topography of the open cast mining operation is always reproduced by virtue of such a comparison procedure. Hitherto manual measurement and surveying procedures have been the usual practice for ascertaining the materials which have been mined, in regard to the amount, position and nature thereof, so that, because of the relatively large amount of time involved in doing that, a precise plan can be drawn up and the model of the open cast mining deposit can be updated for example only once per week.

The publication 'Moderne Technologien und Entwicklungen im Markscheidewesen', Clausthal-Zellerfeld Jubilee Colloquium, May 14th/15th, 1986, issued October, 1986, pages 177 ff, describe possible ways of using satellite geodesy to arrive at automatic ascertainment of the location of a bucket wheel digger or excavator and the bucket wheel thereof in order in that way, by way of the current topography of the open cast mining procedure, to arrive at balance sheets in respect of the materials involved, to provide information about the materials which have already been mined and about the materials which are still present in the deposit. Reference is also made therein to the production of a model of the deposit, which is to be subdivided in such a way as to give addressable cubes of a size of about 4×4×4 meters. In that respect it is correctly assumed that, wherever the position of the bucket wheel of the excavator was located, there can no longer be any material at that point in the deposit. The tests described in that publication however only concerned basically settling the question of whether a receiver or the antenna thereof, which is disposed on the bucket wheel excavator jib, permits sufficiently accurate continuous positional detection of the antenna, while the bucket wheel excavator is in operation. It was not possible in those tests to test practical usability as the necessary requirements for the purpose was lacking.

Even if the receiver or the antenna thereof could be mounted on the bucket wheel, and it will be appreciated that that cannot be the case as the bucket wheel rotates during the extraction operations, that would not give any information about the position of the bucket wheel which would be sufficiently accurate to permit conclusions to be drawn about the materials which have been mined. Bucket wheels of modern bucket wheel excavators are of a very large size in three-dimensional terms. For example the diameters thereof may be more than 20 meters. In other words, even if the receiver could be mounted on the bucket wheel, it would only be possible to ascertain the co-ordinates of a point at the bucket wheel, which however does not give any information whatsoever about the position and orientation of the bucket wheel. That knowledge however would be necessary in order to be able to ascertain in what region the bucket wheel had already removed material from the deposit, especially as there are only ever certain areas of the periphery of the bucket wheel which are in engagement with the deposit.

It will be appreciated that the above-described disadvantages really make themselves felt when the receiver is mounted on the jib at a spacing from the extraction device, that is to say for example at a spacing from the bucket wheel. In addition the large dimensions of the bucket wheel mean that the receiver or the antenna thereof must be disposed at a relatively large distance from the bucket wheel as otherwise, depending on the position of the jib carrying the bucket wheel and therewith also the position of the bucket wheel itself, there is the possibility of the bucket wheel moving into a position in which it is disposed between the antenna and at least one of the satellites, so that it effectively screens the antenna from the satellite. It would then no longer be possible for signals from that satellite to be received. Although the distance which is therefore required between the receiver or the antenna thereof and the bucket wheel is fixed, in this case also it is not sufficient to ascertain the position of the receiver in order to calculate therefrom the position of the bucket wheel itself, as knowing only the co-ordinates of the point corresponding to the antenna also does not make it possible to arrive at any conclusion about the three-dimensional orientation of the jib. However knowledge of that jib orientation is a necessary aspect in order to be able to determine the position and orientation of the bucket wheel of the excavator.

SUMMARY OF THE INVENTION

An object of the present invention is to provide a method of determining mining progress and the mind masses in a deposit to be mined in open cast mining, such as to permit the position of an extraction device such as a bucket wheel to be determined with an adequate degree of accuracy under all conditions occurring in practical operation.

Another object of the present invention is to provide a method of determining mining progress in open cast mining, such as to provide a balance sheet which closely approximates to reality in terms of the materials already extracted and which can provide a current mining report of suitable accuracy.

Still another object of the present invention is to provide a method of determining mining progress in open cast mining, which is versatile in use while affording reliable operation results.

In accordance with the principles of the present invention, the foregoing and other objects are achieved by a method of determining mining progress and the mined masses in a deposit to be mined in open cast mining, wherein when mining the material in the deposit the geodetic position of a portion such as the jib of a large-scale extraction apparatus such as a bucket wheel excavator is detected, such apparatus having a travelling support structure on which said portion is movably carried, and for ascertaining the geodetic position of said portion the measurement signals of at least four satellites are received by a first receiver disposed on said movable portion. The measurement signals of the at least four satellites are received by at least one further receiver disposed on the extraction apparatus in a position which is defined with respect to the first receiver. The received signals are fed to a computing system in which the positions of the first and further receivers and therefrom the orientation in space of the movable portion of the extraction apparatus are ascertained. The computing system stores a model of the deposit, in which the parts of the deposit which have already been mined are identified in dependence on the distance covered by the extraction device of the extraction apparatus.

By virtue of simultaneously detecting the co-ordinates of the two receivers, it is possible to ascertain the orientation of the above-mentioned movable portion of the extraction device, which is in engagement with the deposit to be mined. For that purpose the further receiver must be disposed on the extraction apparatus in such a fashion that the orientation of the movable portion, such as the jib, and thus the position of the extraction device such as a bucket wheel, can be clearly ascertained from the position of each receiver and thus from the distance between the first receiver and the further receiver. More especially the further receiver must be disposed in such a way that it cannot perform any uncontrolled movements relative to the first receiver. One possible way of arranging for that to happen is for example for the further receiver to be disposed at the other end of the jib, which is remote from the extraction device or bucket wheel. It should be appreciated however that arranging the further receiver on the jib in that way would involve the disadvantage that the receiver could be overshadowed by the support structure of the extraction apparatus. It is therefore more particularly appropriate for the further receiver to be arranged on a vertically upwardly extending pylon, mast or comparable component of the support structure of the extraction apparatus. At such a position the further receiver is likely to be virtually free from all interfering influences which could be exerted thereon by the extraction apparatus, and the receiver therefore affords excellent reception capabilities. The jib of the extraction apparatus is admittedly mounted movably in a vertical direction relative to the support structure and therewith also the above-mentioned pylon or mast, but the direction in which the extraction device such as the bucket wheel is disposed can be clearly ascertained form the possibly varying distance between the receivers which corresponds to a defined angular position of the jib. As already mentioned, that distance is ascertained from the detected co-ordinates.

When applying the teaching in accordance with the present invention, it is only possible rotary movement of the jib which bears the extraction device, about an axis extending through the two receivers, that cannot be clearly ascertained. It should be noted at this point however that such a rotary movement should essentially correspond to lateral inclination of the extraction apparatus which generally does not occur or which occurs only to such a slight extent that it can be readily disregarded.

There are also large-scale extraction apparatuses, for example bucket chain excavators, which do not suffer from the problem that at least one of the receivers may be screened relative to one of the satellites by the extraction device thereof. Even in that case however it would still be necessary to provide at least first and second receivers. It will be appreciated that under some circumstances there would be no need to calculate the position of the extraction device from the geodetic position and three-dimensional orientation of the movable portion of the apparatus, for example the jib, as the extraction device, more specifically in this case the bucket chain, extends parallel to the jib, as long as the bucket chain is in engagement with the deposit to be mined.

In order to apply the differential measurement procedure already referred to above, in accordance with a preferred feature of the present invention, the measurement signals from at least four satellites may be simultaneously received by a third receiver which serves as a reference receiver and which is disposed at a known geodetic position at a stationary location at a spacing from the extraction apparatus, and the signals which are simultaneously received by the first receiver, the further receiver and the reference receiver are fed to a computing system for ascertaining the co-ordinates of the first and the further receiver relative to those of the reference receiver.

In a further preferred feature, the third receiver which serves as a reference receiver may be disposed at a position which represents a reference point in a local co-ordinate system which is relevant for the deposit to be mined, and the detected positions of the first and further receivers on the extraction apparatus are fed to a computing system in which the positions of the receivers are transformed into co-ordinates of that local co-ordinate system. That is required in particular if the position of the extraction device such as a bucket wheel is to be related to the deposit and the model of the deposit as already mentioned above.

In addition, transformation of the position co-ordinates into a local co-ordinate system affords the advantage that the position and orientation of the extraction device are specified in the open cast mining co-ordinate system, which thus simplifies control of the movements and operation of the extraction apparatus.

In a preferred feature of the method of the invention, the operation of detecting the positions of the receivers can be effected at spacings in respect of time of between 0.3 second and 600 seconds.

It has been found particularly desirable for the operation of detecting the positions of the receivers to be effected at spacings in respect of time of one second. At any event, when the positions of the receivers are ascertained in a quasi-continuous fashion in that way, the distance covered by the extraction device in the mining operation is also taken into account.

Irrespective of whether the further receiver is also arranged on the movable portion of the extraction apparatus, which carries the extraction device, or on the travelling support structure of the extraction apparatus, which in turn carries the movable portion for the extraction device, the position and orientation of the extraction device can be clearly ascertained, apart from the above-mentioned negligible lateral inclination of the extraction apparatus, while the position of the part of the extraction device which is in engagement with the terrain to be mined can be ascertained by simple geometrical relationships which depend on the configuration of the respective extraction apparatus being used.

Further objects, features and advantages of the present invention will be apparent from the following description of a preferred embodiment.

DESCRIPTION OF THE PREFERRED EMBODIMENT

Figure 1:
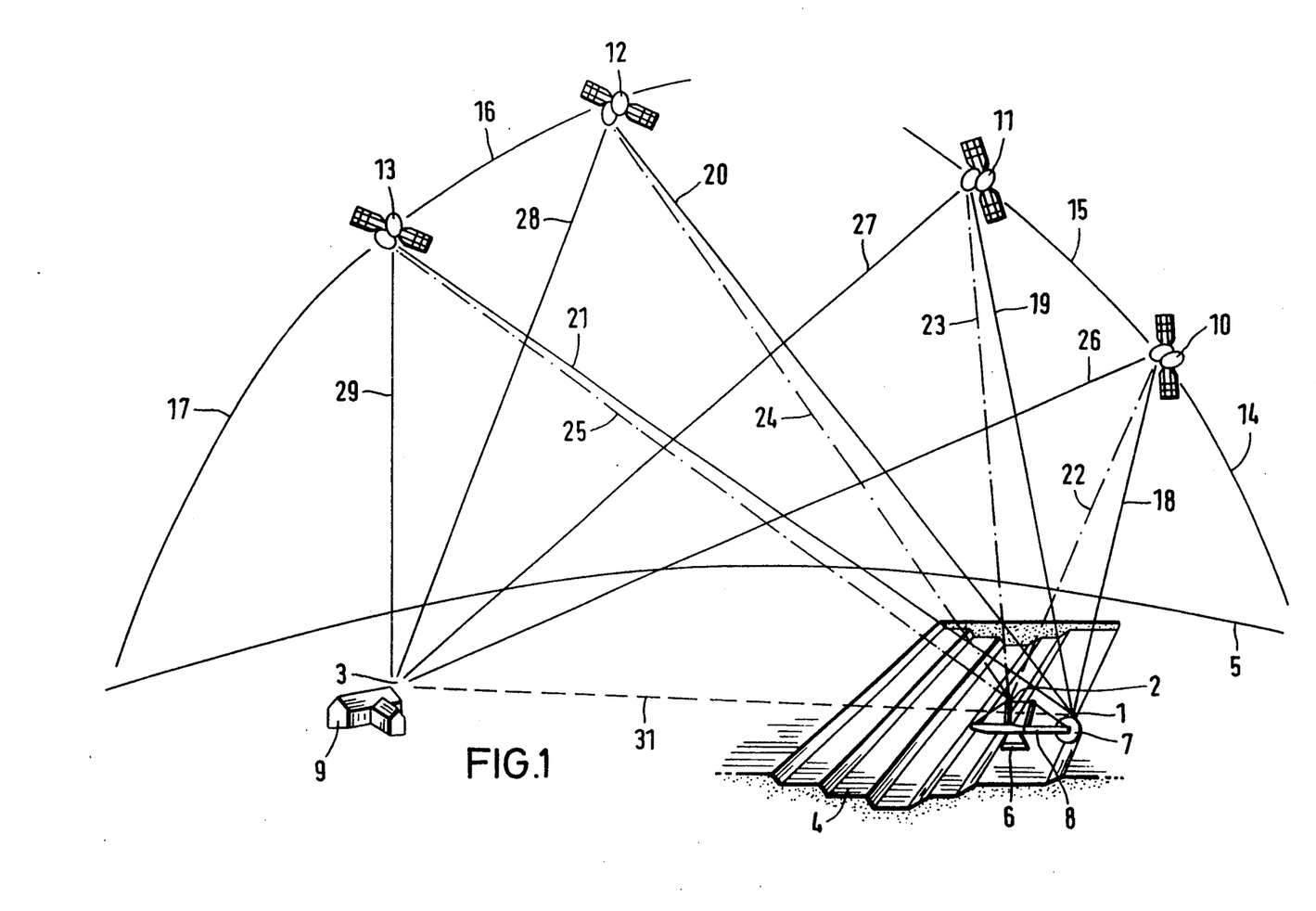
FIG. 1 is a diagrammatic view illustrating the procedure for ascertaining the position of the bucket wheel of a bucket wheel excavator using satellite geodesy.
Figure 2:
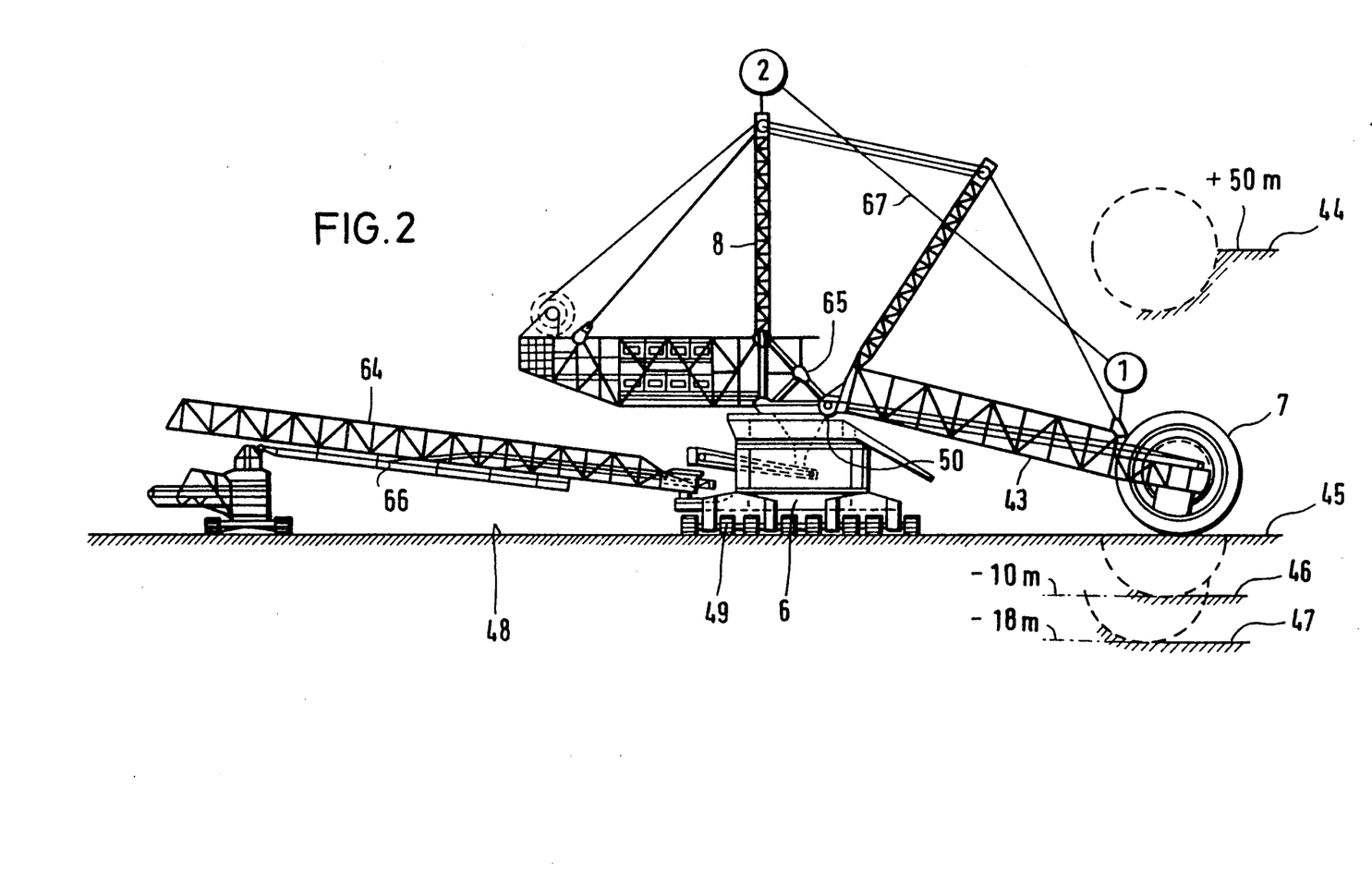
FIG. 2 is a side view of a bucket wheel excavator.

Referring firstly to FIG. 2, shown therein is a large-scale extraction apparatus for use in mining an open cast mining deposit, in the form of a bucket wheel digger or excavator as generally indicated at reference numeral 6. The excavator 6 comprises a travelling support structure 65 which is carried on a travelling gear or chassis 49. The support structure 65 is pivotable relative to the sub-structure with the travelling gear 49, about a vertical axis 50. The support structure 65 movable carries a portion illustrated in the form of a jib 43 which at its free end carries an extraction device in the form illustrated as a bucket wheel 7. The jib 43 is mounted on the support structure 65 in such a way as to be pivotable in an at least substantially vertical plane. The bucket wheel excavator is in use in open cast mining as indicated by reference numeral 4 in FIG. 1, on the surface of the earth, which is delimited by the horizion indicated at 5 in FIG. 1.

A first receiver 1 is arranged on the jib 43 of the excavator 6 shown in FIG. 2, in the vicinity of the bucket wheel 7 which is carried rotatably at the free end of the jib 43. A further receiver 2 is arranged on the excavator 6 at a position which is defined with respect to the first receiver 1, more specifically in the illustrated embodiment of the apparatus being carried on a pylon or mast 8 of the support structure 65.

As shown in FIG. 1, a third receiver 3 which serves as a reference receiver is disposed at a spacing from the excavator 6 in a known geodetic position at a stationary location and more specifically in a building indicated at 9 in FIG. 1, which is outside the open cast mining deposit 4.

Within the radio range or line of sight of the receivers 1, 2 and 3, the earth is encircled by four satellites 10, 11, 12 and 13. The satellites each move on respective orbits which may be different from each other. Thus the satellite 10 moves on the orbit indicated at 14, the satellite 11 moves on the orbit indicated at 15, the satellite 12 moves on the orbit indicated at 16 and the satellite 13 moves on the orbit indicated at 17, around the earth. The orbits 14 through 17 and the co-ordinates of the respective satellites 10 through 12 are known at any time and are emitted with the signals which come from the satellites.

As can be seen from the general view in FIG. 1, the receivers 1, 2 and 3 are in communication with each respective one of the satellites 10 through 13 by way of the measurement beams 18, 19, 20, 21; 22, 23, 24, 25; and 26, 27, 28, 29 respectively.

As soon as one of the satellites 10 through 13 passes out of the range or line of sight of one of the receivers 1 through 3, another satellite of the system takes its place in the appropriate fashion. Care is taken to ensure that there are always four satellites within the range or line of sight of the receivers 1 through 3. Accordingly FIG. 1 represents a portion in respect of time taken from the transmitting-receiving situation as between the receivers 1 through 3 and the satellites 10 through 13. The situation is such at any event as to ensure that at any time a receiver is simultaneously in communication with four satellites so that the co-ordinates of the receiver can be clearly ascertained at all times.

The bucket wheel excavator 6 is horizontally movable on the plain area indicated at 48 in FIG. 2, by means of the travelling gear 49. At its end remote from the bucket wheel 7, the bucket wheel excavator has a further jib 64 which is connected to the support structure 65. The two jibs 43 and 64 are provided with conveyor belts by way of which the materials extracted by the bucket wheel 7 pass on to a conveyor belt 66 which is disposed at a downstream location therefrom.

The first receiver 1 which is arranged at the front portion of the jib 43 bearing the bucket wheel 7 is positioned in such a way that it or the antenna associated therewith can receive the signals from the satellites 10 through 13 in any conceivable position of the jib 43. The further receiver which is arranged on the pylon or mast 8 is not overshadowed by any structures of the bucket wheel excavator so that the further receiver 2 can always be in communication with the four satellites 10 through 13.

The process according to the present invention provides that the co-ordinates of the receivers 1 and 2 are simultaneously determined by means of satellite geodesy. The spacing between the receivers 1 and 2 is fixed, with the co-ordinates. An angular position of the jib 43 in a vertical plane may be clearly associated with the above-mentioned distance between the receivers 1 and 2, whereby the position of the bucket wheel 7 is also clearly established with respect to the receivers 1 and 2. As the receivers 1 and 2 do not move relative to each other with respect to the axis of rotation 50 of the support structure 65 on the travelling gear 49 of the bucket wheel excavator 6, the orientation of the jib 43 and therewith the position of the bucket wheel 7 are also fixed in respect of space, with the direction of the straight line indicated at 67 in FIG. 2, which passes through the two receivers 1 and 2. The negligible lateral inclination of the bucket wheel excavator 6 can be disregarded in that respect.

If the lateral inclination of the apparatus or excavator 6 is not negligible, a further receiver must be provided thereon, in order to detect the angle of such inclination.

FIG. 2 shows that the part of the periphery of the bucket wheel 7, which is in engagement with material to be mined, depends on the angular position of the jib 43 in the vertical plane and the configuration of the surface of the deposit to be mined, which is being engaged by the bucket wheel 7 at any given time. The angular position of the straight line 67 which extends through the receivers 1 and 2 varies depending on the position of the arcuate part of the periphery of the bucket wheel 7, which is in engagement with the material of the deposit to be mined. It is possible, when determining the position of the bucket wheel 7, to establish the arcuate part of the periphery of the bucket wheel 7 which is in engagement with deposit material to be mined, and thus geodetically ascertain the region of the deposit in which material is just being removed. It is the respective region with which the bucket wheel 7 is in engagement.

Figure 3:
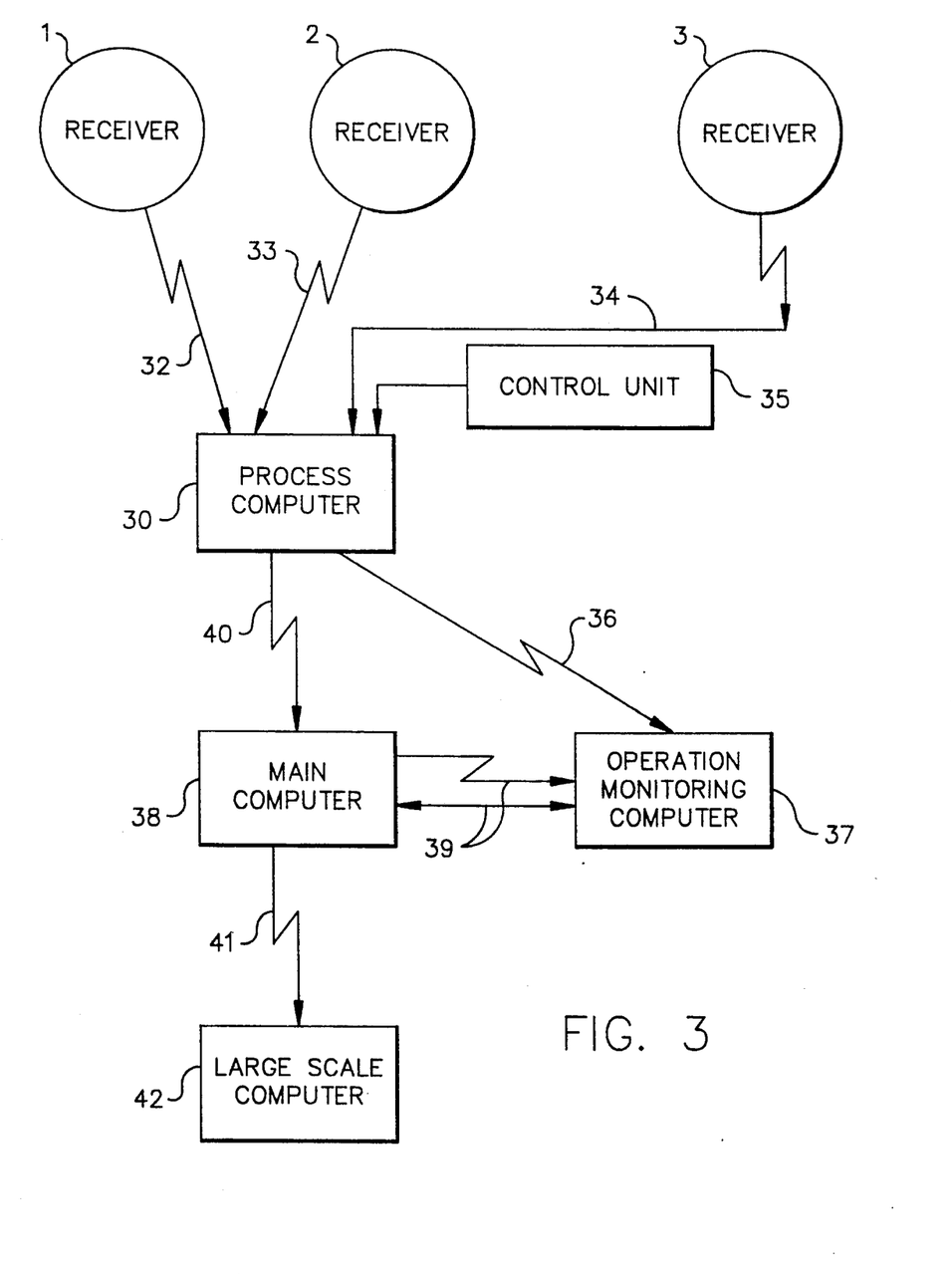
FIG. 3 shows an embodiment of the hardware components for carrying out the method according to the invention, and the interlinking thereof.

FIG. 3 shows the configuration of a computing system and possible interlinking of the components thereof. The receivers 1 and 2 which are disposed on the bucket wheel excavator 6 as described above feed their measurement data by way of the connections 32 and 33 into a process computer 30. The latter may be arranged on the bucket wheel excavator 6, for example within the driving and control compartment thereof. The third receiver 3 which is arranged at a stationary location in the building 9 at the edge of the open cast mining area is also connected to the process computer 30 by way of the connection 34. The connections 32 through 34 may be for example data transmission lines or radio communications.

Also associated with the process computer 30 is a control unit 35 by way of which data relating to the nature of the material extracted by the bucket wheel excavator 6 and signals for stopping or starting the bucket wheel 7 and signals for the arcuate portion of the bucket wheel which is in engagement with material of the deposit to be mined can be transmitted.

Both the process computer 30 and also the main computer 38 which communicates therewith continuously by way of the line 40 may contain information and data relating to a digital model of the deposit which is being operated by the bucket wheel excavator 6. It is conventional practice to provide a computer as indicated at 37 for operation monitoring purposes, which collects and holds statistical data relating to operation of the open cast mining procedure. Such data comprise for example items of information concerning operation of or disturbances to belt installations of the loading of belt-type weighing assemblies and the like. The communication 36 between the process computer 30 and the computer 37 is made for example by way of a radio communication or a data cable.

The operation monitoring computer 37 also communicates with the main computer 38 which is installed for example in the mine surveying installation. Corrections are interchanged between the computers 37 and 38 by way of the two-way connections as indicated at 39. On the other hand the main computer 38 which is in the mine surveying installation is also communicated for interrogation purposes to the process computer 30 on the bucket wheel excavator 6 by way of the communication 40. That provides a link between the three computers 30, 37 and 38, which permits those three computers to communicate with each other. In addition the main computer 38 is also in communication by way of a connection 41 with a large-scale computer 42 which can be set up at another location. All data regarding operational procedures, including that extending beyond the mining operation, are stored in the computer 42. Transmission of data by way of the illustrated connections 36, 39, 40 and 41 can be effected both by radio and also by way of cable, for example copper or glass fiber cable.

Figure 4:
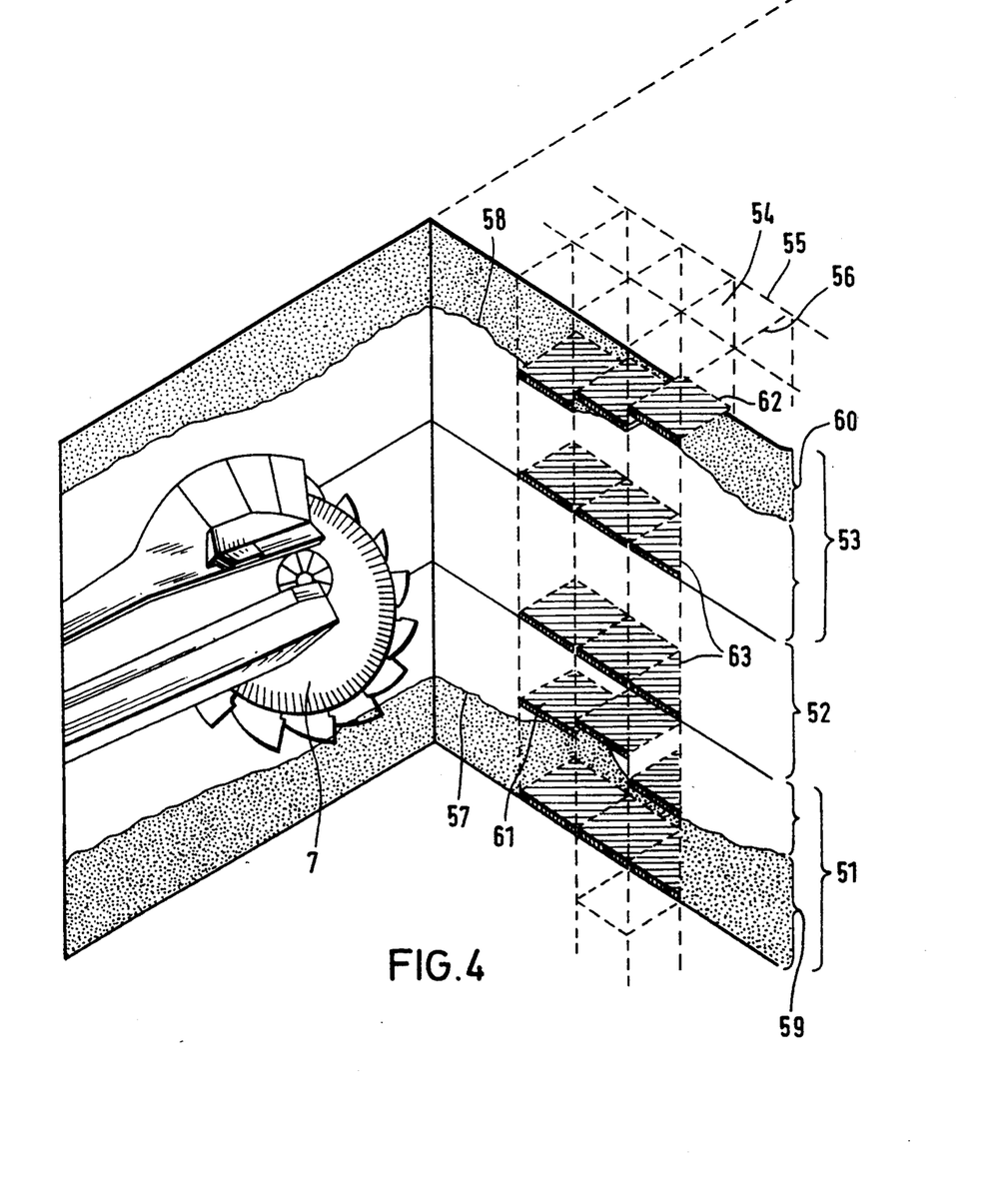
FIG. 4 is a diagrammatic view of a section from a model of a deposit to be mined.

Details of the mining operation are shown in diagrammatic form in FIG. 4. The extraction device such as the bucket wheel 7 is moved in such a way that is successively digs away the regions which are identified within the model of the deposit shown in FIG. 4 as digging sections 51, 52 and 53. The digging sections 51 through 53 are arranged in vertical superposed relationship and each correspond to the thickness of a layer which can be dug away by the bucket wheel 7 in the course of a single cutting operation thereof with the bucket wheel 7 kept at a constant position in respect of height, with the digging movement being produced by pivotal movement of the support structure 65 of the excavator 6 about the vertical axis shown at 50 in FIG. 1.

The open cast mining deposit and thus the portions 51 through 53 are divided in the model shown in FIG. 4 into a pattern of square, vertically extending columns 54, the cross-sectional surface areas of which form a grid with edge lengths as indicated at 55, 56, each being for example of a length of 4 meters. The columns 54 extend over the entire depth of the mining deposit, or at least over all three digging portions 51 through 53 shown in FIG. 4. Associated with each of the columns 54 in the model is a given number or address which is stored in at least one of the computers 30 or 38 and which corresponds to the position of the columns. When drawing up a balance sheet in respect of the materials involved in the mining operation, the procedure adopted is that, wherever the bucket wheel 7 or the periphery of the bucket wheel 7 which is in engagement with deposit material to be mined is detected within the model of the deposit, the still present material from the column 54, above the position of the bucket wheel 7, is removed by computation from the model of the deposit. Depending on whether the material is coal, waste or loess, the removed materials are associated with given computer memories, whereby it is possible to draw up a current balance sheet in respect of the materials involved in the mining operation. The amounts of waste and coal which still remain in the model of the deposit and the materials which have actually been mined can be accurately ascertained by computation in that way.

In addition, by operating on the basis of the respective last detected upper boundaries of the columns 54, it is possible continuously to deduce the current geometry of the mine from the model of the deposit and possibly display it on a picture screen in the driving and control compartment of the excavator 6, or produce an output thereof in some other fashion for example by way of a printer or a plotter.

As shown in FIG. 4, the lowermost and the uppermost digging portions 51 and 53 each have a dividing line 57 and 58 extending continuously therethrough. In the regions indicated at 59 and 60 respectively there is a material which differs from the other material in the respective portion 51 or 53 respectively, for example coal in comparison with waste or vice-versa.

In the region of the columns 54 the lines 57 and 58 mark dividing surfaces 61 and 62 within the digging portions 51 and 53. Besides the masses of material from the columns 54, the surfaces 61 and 62 are also incorporated into the balance sheet in respect of the mining operation, which is produced by the computer procedure referred to above. The surfaces 61 and 62 are already preset by programming within the columns 54, on the basis of the geological deposit projection which precedes the mining operation, or on the basis of a mine planning system. It will be appreciated however, that the way in which the surfaces 61 and 62 are predetermined is as accurate or inaccurate as the geological projection itself. By virtue of the position of the bucket wheel 7 being ascertained by geodetic means during the mining operation as described above, it is possible to ascertain the position of the cut surfaces 61 and 62 with a higher degree of accuracy. For that purpose the operator of the bucket wheel excavator gives suitable control commands to the process computer 30. The control commands then continuously form the basis for the model of the mining procedure as mining progresses. That can therefore enhance the level of accuracy in regard to ascertaining the balance sheet in respect of the materials involved.

apart for ascertaining the position of the bucket wheel of a bucket wheel excavator, it is also possible for example in accordance with the invention to determine the position of the discharge end of a depositing or loading machine. In that way it is possible to ascertain for example the location and the amount and possibly also the nature of the materials being discharged and set down by that machine, at all times.

A particular advantage of the invention is that it is possible to draw up a current mass balance sheet and a current state of the geometry of the mining procedure and the deposit at any time. In that connection the operation of ascertaining the co-ordinates of the respective receivers takes place in an approximately continuous fashion, for example once per second, although the operation of detecting the positions of the receivers may be effected at spacings in respect of time of between 0.3 second and 600 seconds. The data involved can be substantially immediately available, thereby making it possible to achieve effective control and planning of use of a large-scale extraction apparatus within the mining operation.

It will be appreciated that the above-described method and installation have been set forth solely by way of example and illustration of the principles of the present invention and that various modifications and alterations may be made therein without thereby departing from the spirit and scope of the present invention.

What is claimed is:

1. A method of determining mining progress and the mined mass in a deposit to be mined in open cast mining, using a large-scale extraction apparatus which comprises a travelling support structure, a support portion mounted movably thereon, and at least one extraction device carried on the support portion, comprising the step, carried out when mining material in the deposit, of:

receiving signals from at least four satellites by means of a first receiver disposed on said support portion of the extraction apparatus;

while said signals from at least four satellites are being received by said first receiver, receiving said signals by means of at least one further receiver disposed on the extraction apparatus at a position which is spaced from, but defined with respect to, the first receiver;

ascertaining the geodetic position of said first receiver from the signals received by said first receiver;

ascertaining the geodetic position of said further receiver from the signals received by said further receiver; and     determining, from the geodetic positions of said first and further receivers, the orientation in space of the support portion of the extraction apparatus;

whereby a model of the deposit can be established in which the parts of the deposit which have already been mined are identified.

2. A method as set forth in claim 1 wherein said extraction device which is carried by the support portion of the extraction apparatus is such as to preclude a receiver for the signals from said at least four satellites being disposed on said extraction device, and wherein the position of said extraction device is determined from the geodetic position and the orientation in space of the support portion.

3. A method as set forth in claim 1 including the step, carried out while receiving signals from said at least four satellites by means of said first and further receivers, of receiving said signals by means of a third receiver which serves as a reference receiver and which is arranged in a known geodetic position at a stationary location at a spacing from the extraction apparatus, and ascertaining, from the signals received by said first, further and third receivers, the co-ordinates of the first and the further receivers relative to those of the third receiver.

4. A method as set forth in claim 3 wherein the third receiver is disposed at a position representing a reference point in a local coordinate system which is relevant to the deposit to be mined, and wherein the detected positions of the first and further receivers on the extraction apparatus are transformed into co-ordinates of said local co-ordinate system.

5. A method as set forth in claim 1 wherein the operation of detecting the positions of the receivers is repeated at time intervals of between 0.3 second and 600 seconds.

6. A method as set forth in claim 1 wherein the operation of detecting the positions of the receivers is repeated at time intervals of about one second.

7. A method as set forth in claim 1 wherein said further receiver is disposed on said travelling support structure on which said support portion is movably mounted and including the step of ascertaining the spacing of said first and further receivers from each other from the detected positions of said first and further receivers.

8. A method as set forth in claim 1 wherein said extraction apparatus is a bucket wheel excavator.

9. A system for determining mining progress in open cast mining using an installation comprising a large-scale extraction apparatus including a travelling support structure, a support portion mounted movably thereon, an extraction device carried on the support portion and operable to mine material from the deposit, a first receiver disposed on the support portion for receiving signals from at least four satellites, a second receiver for receiving signals from said at least four satellites and disposed on the extraction apparatus at a position spaced from said first receiver, and a third receiver adapted to operate as a reference receiver and disposed at a known stationary geodetic location at a spacing from said extraction apparatus, whereby, when mining material from the deposit, the coordinates of the first and second receivers relative to those of the third receiver can be determined from the signals received from said satellites by said first, second and third receivers and the positions of the first and second receivers, and therefrom the orientation in space of the support portion of the extraction apparatus, can be determined during mining for control of the mining operation.

* * * * *